United States Patent
Kwak

(10) Patent No.: US 7,798,531 B2
(45) Date of Patent: Sep. 21, 2010

(54) ELECTRIC FUSION PIPING MATERIALS WITH SCREW PRESSING DEVICE

(75) Inventor: You-Shik Kwak, Busan (KR)

(73) Assignee: Taeil Co., Ltd., Busan (KR)

(*) Notice: Subject to any disclaimer, the term of this patent is extended or adjusted under 35 U.S.C. 154(b) by 165 days.

(21) Appl. No.: 12/223,447

(22) PCT Filed: Feb. 1, 2007

(86) PCT No.: PCT/KR2007/000540
§ 371 (c)(1), (2), (4) Date: Jul. 31, 2008

(87) PCT Pub. No.: WO2007/091799
PCT Pub. Date: Aug. 16, 2007

(65) Prior Publication Data
US 2009/0167014 A1    Jul. 2, 2009

(30) Foreign Application Priority Data
Feb. 6, 2006    (KR) .................... 10-2006-0011190
Jan. 29, 2007    (KR) .................... 10-2007-0008964

(51) Int. Cl.
*F16L 47/03* (2006.01)
(52) U.S. Cl. .................................................. 285/21.1
(58) Field of Classification Search ............... 285/21.1, 285/21.2, 21.3, 22; 219/633, 643
See application file for complete search history.

(56) References Cited

U.S. PATENT DOCUMENTS

| 4,072,328 A | * | 2/1978 | Elliott | 285/148.28 |
| 4,508,368 A | * | 4/1985 | Blumenkranz | 285/21.2 |
| 4,927,183 A | * | 5/1990 | Steinmetz et al. | 285/21.2 |
| 5,277,456 A | * | 1/1994 | Mer et al. | 285/21.2 |
| 5,462,314 A |   | 10/1995 | Goto et al. | |
| 6,250,686 B1 | * | 6/2001 | Becker et al. | 285/21.2 |
| 6,450,544 B2 | * | 9/2002 | Becker et al. | 285/21.2 |
| 6,494,501 B2 | * | 12/2002 | Gotoh | 285/371 |
| 2002/0008382 A1 | * | 1/2002 | Becker et al. | 285/21.1 |
| 2002/0135179 A1 | * | 9/2002 | Boyle et al. | 285/21.1 |
| 2006/0001259 A1 | * | 1/2006 | Carter et al. | 285/21.2 |
| 2006/0244256 A1 | * | 11/2006 | Hyobu et al. | 285/247 |

FOREIGN PATENT DOCUMENTS

| GB | 2209373 A | * | 5/1989 |
| JP | 6-300177 | | 10/1994 |
| JP | 8-152090 | | 6/1996 |
| JP | 11-013982 | | 1/1999 |
| WO | 91/15706 | | 10/1991 |

OTHER PUBLICATIONS

International Search Report issued Apr. 30, 2007 in the International (PCT) Application of which the present application is the U.S. National Stage.

* cited by examiner

*Primary Examiner* — James M Hewitt
(74) *Attorney, Agent, or Firm* — Wenderoth, Lind & Ponack, L.L.P.

(57) ABSTRACT

An electric fusion pipe coupling is adapted for bonding with plastic pipes by electric fusion. The pipe coupling can convert the rotation of a pressing member into linear motion by threads to directly or indirectly press a heating element provided in the inner periphery of a pipe joint of the pipe coupling in order to press melting parts heated by the heating element, thereby producing pressure necessary for fusion bonding as well as eliminating an interface of impurities, thereby enhancing fusion efficiency.

11 Claims, 3 Drawing Sheets

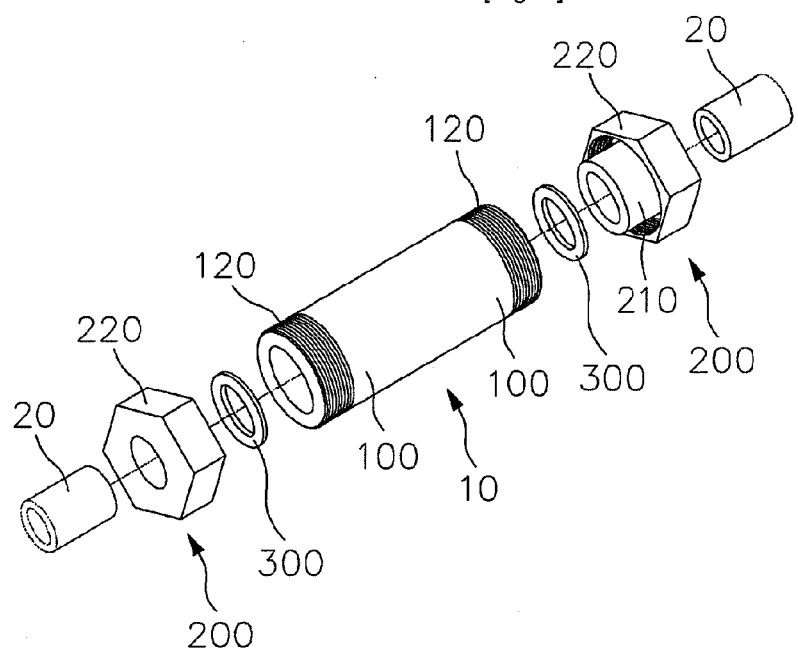
[Fig. 1]
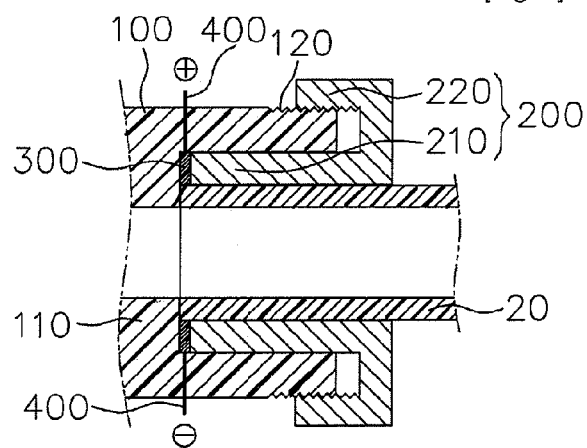
[Fig. 2]

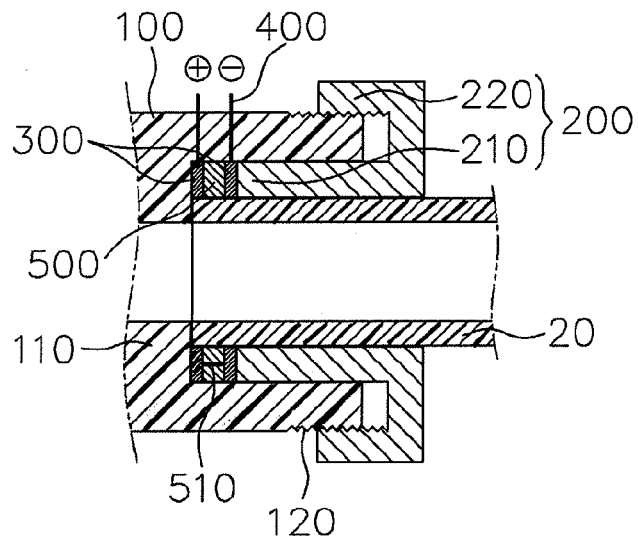
[Fig. 3]
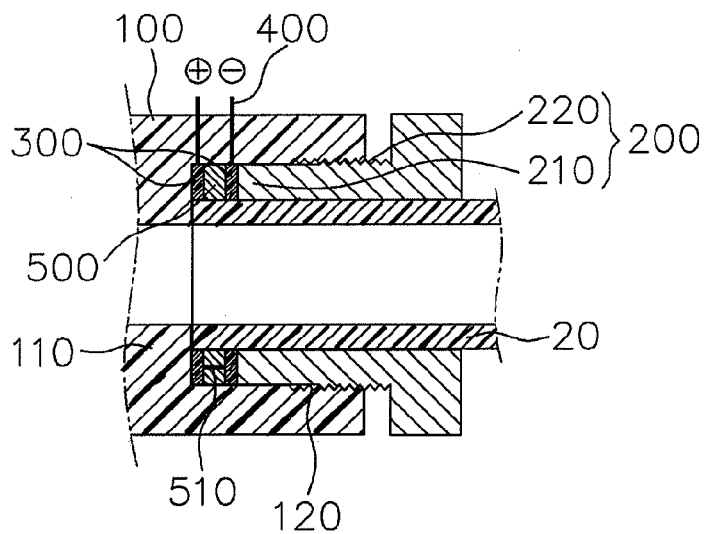
[Fig. 4]
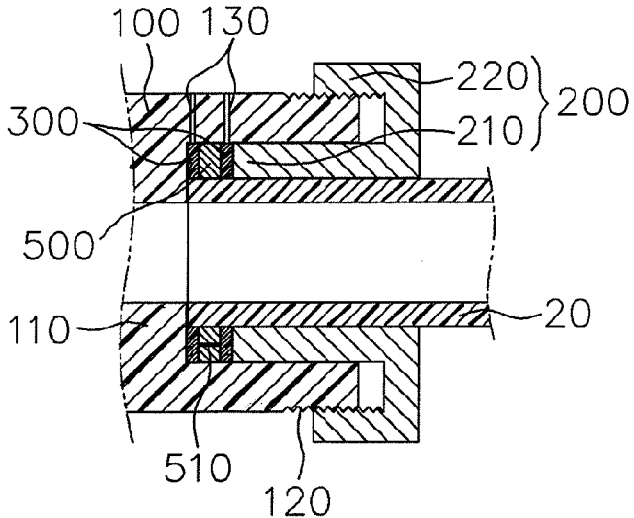
[Fig. 5]

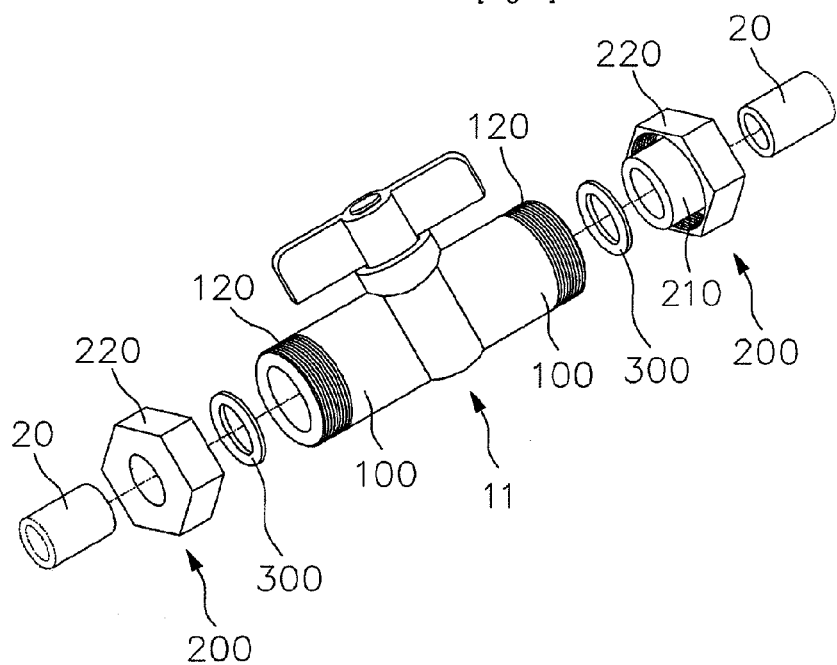
[Fig. 6]
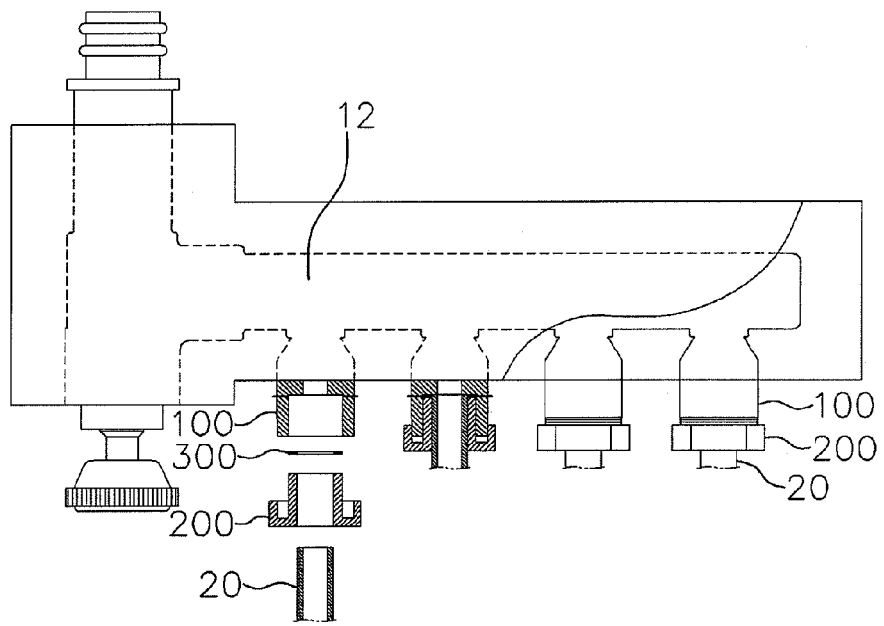
[Fig. 7]

ELECTRIC FUSION PIPING MATERIALS WITH SCREW PRESSING DEVICE

TECHNICAL FIELD

The present invention relates to piping materials adapted for electric-fusion to connect plastic pipes, which are used as gas pipes, tap water pipes and the like.

More particularly, the present invention relates to piping materials designed to facilitate bonding with other plastic pipes via electric-fusion.

BACKGROUND ART electric-fusion is generally used for connecting pipes, and such electric-fusion of pipes will be briefly described below.

In the bonding of pipes made of polyethylene or polypropylene to be used for tap water pipes and other purposes, heat fusion processes have been basically used to obtain a completely hermetic seal.

Conventional heat fusion processes include butt fusion welding, heat fusion socket welding, electro-fusion socket welding, and so on.

Butt fusion welding is also referred to as butt welding, in which end faces of pipes are butted against each other without the use of an additional socket. In detail, butt fusion welding is carried out according to the following steps of: fixing the pipes with hydraulic or pneumatic clamps in such a way that the end faces of the pipes to be welded face each other, smoothing the end faces to be welded, placing a heating plate between the end faces, tightly pressing the end faces to be welded against the heating plate via hydraulic or pneumatic pressure, heating the heating plate to a suitable melting point (e.g., about 210° C. for polyethylene) to fuse the end faces of the pipes, removing the heating plate quickly after the fusion, tightly pressing the fused end faces of the pipes against each other, and cooling the pipes while maintaining them in the pressed position for a predetermined time, so that the fused portions of the pipes are solidified, thereby bonding the pipes together.

This process bonds the pipes by melting pipe materials without the use of an additional socket. However, this process requires a hot welder, which is heavy and thus difficult to carry to a working site, and furthermore, has a complicated structure.

Another process uses a common socket, in which the inner periphery of the socket and the outer periphery of a pipe are melted simultaneously and then bonded together. That is, the outer periphery of the pipe and the inner periphery of the socket are heated at the same time so that the welding surface of each is melted simultaneously, and when they are heated sufficiently, the inner periphery of the socket is quickly fitted onto the outer periphery of the pipe and is thus in tight contact therewith. Then, the resultant structure is cooled down for a predetermined time in this tight contact state.

A further process is electro socket fusion. This process uses a socket having a heating element such as a heating coil inserted therein. The socket is injection-molded with the heating element integrally disposed therein. The heating coil may include, for example, wires of Cu, Cu alloys, nichrome, or the like, which have a specific degree of electric resistance. The socket may be fabricated, for example, by coiling an electric resistance wire coated with a thermoplastic resin, connecting electric terminals to ends of the wire, inserting the wire into a mold, and molding a resin integrally with the wire. After the socket fabricated in this way is fitted onto a pipe to be fused, electric current is applied to the socket for a predetermined time by a simple power supply so that the outer periphery of the pipe and the inner periphery of the socket are melted simultaneously and bonded together.

Such electro socket fusion is also referred to as electric fusion or electro fusion.

electric-fusion has been used generally in connector pipes.

At present, electro-fusion connector pipes are preferred by users because they are easy to use, and various heating elements for the electro-fusion connector pipes are being developed.

In addition to the foregoing approaches, electro-fusion is also disclosed in Korean Patent Application Publication No. 10-2002-0012809, entitled "Electronic Fusion Sheet of Thermoplastic (e.g., Polyethylene and Polypropylene) Pipes by Printed (Coated) Heating Circuit," Korean Patent Application Publication No. 10-2004-069622, entitled "Heat Generating Bushing for Plastic Pipes," Korean Patent Application Publication No. 10-2004-0096757, entitled "Fusion Structure for Plastic Pipes," Korean Patent Application Publication No. 10-2005-0003231, entitled "Fusion Structure for Plastic Pipes Using Fusion Ring" and so on, which are incorporated hereby in their entirety for reference.

However, current electro-fusion connector pipes have the following problems:

(1) In the case of fusion bonding, the surfaces to be bonded should be free from impurities in order to realize airtightness or watertightness. The impurities on the bonding surfaces act as an interface, obstructing bonding of melting parts. Thus, the impurities are a factor that degrades bonding efficiency. To prevent such a problem, the surfaces to be bonded are cleaned prior to being fusion bonded. However, some impurities in the form of a thin film are rarely cleaned.

(2) In the bonding by fusion, it is important to bond two parts under a suitable degree of pressure. (For example, melting parts are bonded together while being tightly pressed against each other in the case of butt fusion, in which a pressing process is performed hydraulically or pneumatically.) In traditional electro fusion process, natural heat expansion is the only resource that generates a bonding pressure and an artificial pressure from outside has not been considered since the heating element is installed inside the connector pipe.

(3) However, in order to use the pressure owing to the natural expansion, a very small clearance is required between the inner periphery of the electro-fusion connector pipe and the outer periphery of the plastic pipe, inserted into the connector pipe. Precision machining, required to minimize the clearance, also raises manufacturing costs.

SUMMARY OF THE INVENTION

Technical Problem

The present invention has been made to solve the foregoing problems with the prior art, and therefore an object of the present invention is to provide a novel electric fusion piping materials, which can convert the rotation of a pressing member into linear motion by means of threads to directly or indirectly press a heating element provided in the inner periphery of a pipe joint of the piping materials in order to press melting parts heated by the heating element, thereby producing a pressure necessary for fusion bonding as well as breaking an interface of impurities, thereby enhancing fusion efficiency.

Technical Solution

According to an aspect of the invention for realizing the object, the electric fusion piping materials of the invention includes a pipe joint made of plastics to be connected with a plastic pipe, the pipe joint having threads formed on the peripheral surface thereof for screwing; an annular heating element arranged inside the pipe joint to enable electric-fusion; and a pressing member having a threaded portion to be screwed into the threads of the pipe joint and a pressing portion for moving forward in response to rotation of the threaded portion to press the annular heating element.

Advantageous Effects

As described above, the invention provides a novel electric fusion piping materials, which can convert the rotation of a pressing member into linear motion by means of threads to directly or indirectly press a heating element provided in the inner periphery of a pipe joint of the piping materials in order to press melting parts heated by the heating element, thereby producing the pressure necessary for fusion bonding as well as breaking an interface of impurities, thereby enhancing fusion efficiency.

That is, bonding efficiency is excellent since bonding parts are hot-bonded and cooled down under a preset pressure.

Furthermore, since the interface of impurities in the boding parts is broken under a shearing force at a high temperature, any deterioration in bonding owing to the impurity interface can be prevented.

In view of the foregoing, it is possible to increase the tolerance of the outside diameter of the plastic pipes and the inside diameter of the pipe joint. This can consequently reduce the cost of manufacturing the plastic pipes and the piping materials, and thus realizes high quality electric-fusion at a low cost.

BRIEF DESCRIPTION OF THE DRAWINGS

FIG. 1 is an exploded perspective view illustrating major elements of piping materials for electric-fusion according to a first embodiment of the invention, in use with plastic pipes;

FIG. 2 is a cross-sectional view illustrating the pipe joints of the piping materials prior to electric-fusion between the piping materials and the plastic pipes shown in FIG. 1;

FIGS. 3 to 5 are cross-sectional views each illustrating a pipe joint of piping materials for electric-fusion according to different embodiments of the invention, prior to being electric-fused with a plastic pipe; and FIGS. 6 and 7 illustrate piping materials of the invention, applied to a valve and a distribution header, respectively.

BRIEF DESCRIPTION OF THE INVENTION

A first embodiment of the present invention will now be described in detail by way of its construction and operation.

FIG. 1 is an exploded perspective view illustrating major elements of piping materials for electric-fusion according to a first embodiment of the invention, in use with plastic pipes, and FIG. 2 is a cross-sectional view illustrating the pipe joints of the piping materials for electric-fusion prior to electric-fusion between the piping materials and the plastic pipes shown in FIG. 1.

The piping materials for electric-fusion shown in FIG. 1 is a connector pipe 10.

The connector pipe 10 is used to connect two plastic pipes 20 together.

Thus, the connector pipe 10 has two or more pipe joints 100, each of which is connected to a corresponding one of the plastic pipes 20. Needless to say, in the connector pipe 10, at least the pipe joints 100 should be made of plastics.

The pipe joint 100 is pipe-shaped such that the plastic pipe 20 can be inserted therein.

In addition, the pipe joint 100 is provided at the inner periphery thereof with a step 110 to stop and support one end of the plastic pipe 20 upon insertion into the pipe joint 100. The step 110 is configured in such a fashion that the plastic pipe 20 can be inserted to a suitable depth and located suitably.

The joint 100 also has threads 120 formed on the outer periphery adjacent to the end of the joint 100. The threads 120 are screwed into a pressing member 200, which will be described later.

Alternatively, the joint threads 120 may be formed on the inner periphery of the pipe joint 100, or spaced from the end of the pipe joint 100.

In the meantime, in the inner periphery of the pipe joint 100, an annular heating element 300 is provided for electric-fusion. The annular heating element 300 is connected to electric terminals 400, and generates heat in response to an external electric power applied thereto through the electric terminals 400. As the annular heating element 300 generates heat, it causes surrounding regions to melt.

The annular heating element may be any annular structure that generates heat when electric power(current) is applied thereto. While the heating element of the invention is made of conductive plastics, it may also be made of metal.

The pressing member 200 is screwed into the end of the pipe joint 100.

The pressing member 200 has a threaded portion 220 in an outer region, which has female threads to be screwed into the end of the pipe joint 100. The pressing member 200 also has a pressing portion 210 in an inner region, which is configured to be inserted into the inner periphery of the pipe joint 100 to directly or indirectly press the annular heating element 300.

The pressing member 200 generally has a hexagonal outer shape, like a hexagonal nut, thereby making it easy for users to turn the pressing member 200.

Thus, when the pressing member 200 is turned, the threaded portion 220 screwed into the pipe joint 100 rotates and moves forward together with the pressing member 200 which is integrated with the threaded portion 220.

The operation of this embodiment will now be described.

As shown in FIG. 2, after the connector pipe 10 for electric-fusion of the invention is arranged together with the plastic pipes 20, the electric terminals 400 are electrically connected to a power supply (not shown) for a predetermined time period. Then, the heating elements 300 generate heat to raise the temperature of surrounding elements, such as the inner peripheries of the pipe joints 100 and the outer peripheries of the plastic pipes 20, up to the point where the surrounding elements melt (hereinafter the surrounding elements will be referred to as "melting part(s)").

The inner peripheries of the pipe joints and the outer peripheries of the plastic pipes are heated and thus raised in temperature through a glass transition temperature up to a softening temperature.

When the melting parts are heated up to the softening temperature, the pressing members 200 are turned so that the pressing members 200 move forward to directly or indirectly press the annular heating elements 300, thereby pressing the melting parts. The pressure applied against the melting parts is adjusted according to the degree of rotation of the threaded portions 220. When the threaded portions 220 stop rotating, the pressure is maintained constant.

Then, the melting parts are melted while pressure is applied so that the inner peripheries of the pipe joints and the outer peripheries of the plastic pipes around the heating elements are fused together.

According to embodiments, after the melting parts are melted at a temperature adjacent to the softening point, the pressing members 200 may be turned to press the melting parts.

Since the melting parts are bonded together under a predetermined pressure at a high temperature, bonded portions show excellent bonding efficiency when cooled down.

In addition, while the melting parts (the inner peripheries of the pipe joints and the outer peripheries of the plastic pipes) are pressed at a specific pressure, any interfaces owing to impurities therein are broken by a high temperature and shearing force. This can consequently prevent potential deterioration of bonding performance that otherwise may be caused by the impurities.

A second embodiment of the invention will now be described.

FIG. 3 is a cross-sectional view illustrating a pipe joint of piping materials for electric-fusion according to the second embodiment of the invention, prior to being electric-fused with a plastic pipe.

In this embodiment, a pair of annular heating elements 300 is provided on one end of a pipe joint 100.

The pair of annular heating elements 300 is heated by an electric current supplied through electric terminals 400.

In addition, an annular welding filler 500 is interposed between the annular heating elements.

The annular welding filler 500 is made of plastics having a melting point lower than that of the pipe joint 100 and, as the temperature rises, melts before the pipe joint 100. The melted welding filler 500 is press-bonded and then cooled down to tightly bond the pipe joint 100 with a plastic pipe 20.

The annular welding filler 500 is provided with a connecting wire 510 for electric connection of the annular heating elements 300 disposed at both sides of the welding filler 500.

The pair of annular heating elements 300 and the annular welding filler 500 interposed between the heating elements 300 can be fabricated separately or integrated together.

A third embodiment of the invention will now be described.

FIG. 4 is a cross-sectional view illustrating a pipe joint of piping materials for electric-fusion according to the third embodiment of the invention, prior to being electric-fused with a plastic pipe.

In this embodiment, threads 120 are formed in the inner periphery of a pipe joint 100. Thus, a threaded portion 220 of a pressing member 200, to be screwed into the threads 120 of the pipe joint 100, is formed on the outer periphery of the pressing member 200.

A fourth embodiment of the invention will now be described.

FIG. 5 is a cross-sectional view illustrating a pipe joint of piping materials for electric-fusion according to the fourth embodiment of the invention, prior to being electric-fused with a plastic pipe.

In this embodiment, an electric terminal is not provided in piping materials itself.

That is, terminal holes 130 are formed in a piping joint 100 so that electric terminals of an outer power supply (not shown) are inserted into the terminal holes 130 to supply electric current to annular heating elements arranged in the inner periphery of the pipe joint 100.

The electric terminals 400 and/or the terminal holes 130 may be arranged in various forms according to the number of heating elements. In addition, in the case in which electric current is supplied to a plurality of heating elements, various arrangements may be proposed according to a heating element circuit. That is, the heating element circuit may have a serial structure, or a parallel structure, or a serial and parallel structure.

The electric terminals or the terminal holes may be provided in the pipe joint or the pressing member. Occasionally, the electric terminals or the terminal holes may be provided between the pipe joint and the pressing member or between the pressing member and the plastic pipe.

While the foregoing exemplary embodiments have been described with the assumption that the heating elements are ones other than the melting parts, the heating elements may also be devised to melt.

For example, it is possible to apply the invention in such a fashion that the heating elements are made of conductive plastic. Then, it is possible to use the conductive plastic as heating elements by supplying electric current to the conductive plastic in order to melt the conductive plastic itself as well as surrounding plastic material parts.

FIGS. 6 and 7 illustrate respective piping materials of the invention, in which the connector pipe 10 is replaced with other piping components. In particular, the invention can be applied to an electric-fusion valve 11 (see FIG. 6) and to a distribution header 12 (see FIG. 7).

The electric-fusion valve 11 is provided in pipes to open/close the flow of fluid through the pipes or regulate the flow rate thereof. Therefore, the electric-fusion valve 11 has two or more pipe joints 100, each of which is connected to a plastic pipe 20. Needless to say, in the valve 11, at least the pipe joints 100 should be made of plastics.

The electric-fusion distribution header 12 is used to receive fluid introduced through an inlet pipe joint and then allow the fluid to flow out through a plurality of outlet pipe joints. The distribution header 12 is of the type that is used for heating, and has one inlet pipe joint for introducing heating water from, for example, a boiler and a plurality of outlet pipe joints for feeding the heating water to a plurality of devices using the heating water. Thus, the electric-fusion distribution header 12 is provided with at least two pipe joints 100, each of which is connected with a plastic pipe 20. As a matter of course, in the distribution header 100, at least the pipe joints 100 should be made of plastics.

In these embodiments, the pipe joints 100 can be connected with the plastic pipes 20 by adopting any of the connection structures shown in FIGS. 2 to 5.

While the present invention has been described with reference to the particular illustrative embodiments and the accompanying drawings, it is not to be limited thereto, but will be defined by the appended claims. It is to be appreciated that those skilled in the art can substitute, change or modify the embodiments into various forms without departing from the scope and spirit of the present invention.

INDUSTRIAL APPLICABILITY

The present invention as set forth above can be applied to various types of electric fusion piping materials available for plastic pipes such as gas pipes and tap water pipes. The piping materials include, for example, a connector pipe, valve and distribution header.

The invention claimed is:

1. An electric fusion pipe coupling comprising:
   a pipe joint made of plastic to be connected with a plastic pipe, the pipe joint having threads formed on a peripheral surface for screwing and defining an annular cavity;
   an annular heating element arranged within the pipe joint cavity to generate heat for electric fusion; and
   a pressing member having a threaded portion for being screwed into the threads of the pipe joint and a pressing portion extending into the cavity and for moving forward in response to rotation of the threaded portion to press the annular heating element.

2. The electric fusion pipe coupling materials according to claim 1, wherein the heating element is made of conductive plastic.

3. The electric fusion pipe coupling materials according to claim 1, wherein the pipe joint or the pressing member has an electric terminal for supplying electric power to the heating element.

4. The electric fusion pipe coupling materials according to claim 1, wherein the pipe joint or the pressing member has a terminal hole for supplying electric power to the heating element.

5. The electric fusion pipe coupling materials according to claim 1, further comprising an annular welding filler arranged adjacent to the annular heating element.

6. The electric fusion pipe coupling materials according to claim 5, wherein the annular welding filler is arranged between the pressing portion and the annular heating element.

7. The electric fusion pipe coupling materials according to claim 5, wherein the annular heating element comprises a plurality of annular heating elements, and the annular welding filler is arranged between the annular heating elements.

8. The electric fusion pipe coupling materials according to claim 5, wherein the annular heating element and the annular welding filler are integrated with each other.

9. The electric fusion pipe coupling materials according to claim 2, wherein the pipe joint or the pressing member has an electric terminal for supplying electric power to the heating element.

10. The electric fusion pipe coupling materials according to claim 2, wherein the pipe joint or the pressing member has a terminal hole for supplying electric power to the heating element.

11. The electric fusion pipe coupling materials according to claim 2, further comprising an annular welding filler arranged adjacent to the annular heating element.

* * * * *